United States Patent [19]
Nagano

[11] Patent Number: 5,257,562
[45] Date of Patent: Nov. 2, 1993

[54] BICYCLE CRANK MECHANISM
[75] Inventor: Masashi Nagano, Izumi, Japan
[73] Assignee: Shimano, Inc., Osaka, Japan
[21] Appl. No.: 896,435
[22] Filed: Jun. 10, 1992
[30] Foreign Application Priority Data
   Jun. 19, 1991 [JP] Japan .................. 3-147019
[51] Int. Cl.$^5$ ............................. B62M 3/08
[52] U.S. Cl. ................... 74/594.2; 74/594.3; 74/594.4
[58] Field of Search ........... 74/594.1, 594.2, 594.3, 74/594.4

[56] References Cited

U.S. PATENT DOCUMENTS

| | | | |
|---|---|---|---|
| 571,753 | 11/1896 | Decker | 74/594.4 X |
| 1,714,134 | 5/1929 | Poyser | 74/594.3 |
| 2,024,499 | 12/1935 | Baron | 74/594.4 |
| 2,644,345 | 7/1953 | Sebel | 74/594.1 |
| 4,625,580 | 12/1986 | Burt | 74/594.4 |

FOREIGN PATENT DOCUMENTS

| | | | |
|---|---|---|---|
| 2579554 | 10/1986 | France. | |
| 664053 | 1/1952 | United Kingdom | 74/594.4 |

Primary Examiner—Richard M. Lorence
Attorney, Agent, or Firm—Dickstein, Shapiro & Morin

[57] ABSTRACT

A crank mechanism for a bicycle includes a crank axle, a crank arm rotatable with the crank axle, a pedal shaft attached to the crank arm, and a pedal rotatably supported by the pedal shaft. The pedal is also movable to and fro relative to and in directions perpendicular to the pedal shaft.

9 Claims, 9 Drawing Sheets

BICYCLE CRANK MECHANISM

BACKGROUND OF THE INVENTION

1. Field of the Invention

The present invention relates to a bicycle crank mechanism, and more particularly to a mechanism for attaching a pedal to a crank arm.

2. Description of the Related Art

In a conventional bicycle, a pedal is rotatably attached to a crank arm through a pedal shaft. The pedal is only rotatable relative to the pedal shaft.

During a down stroke of the crank arm, it is easy for the rider to exert a treading force if the arch of his or her foot lies directly over the pedal shaft. During an up stroke of the crank arm, the pedal is easy to pull upward if the forward end of the rider's foot is close to the pedal shaft particularly where the rider's shoe is fixed to the pedal through a cleat. Thus, there is room for improvement in the conventional bicycle which does not allow a to-and-fro motion of the pedal relative to the pedal shaft.

SUMMARY OF THE INVENTION

An object of the present invention is to provide a bicycle in which a pedal is not only rotatable about a pedal shaft but movable to and fro relative thereto to facilitate pedaling action.

The above object is fulfilled, according to the present invention, by a crank mechanism for a bicycle comprising a crank axle, a crank arm rotatable with the crank axle, a pedal shaft attached to the crank arm, and a pedal rotatably supported by the pedal shaft, the pedal being also movable to and fro relative to and in directions perpendicular to the pedal shaft.

With this construction, the position of the pedal relative to the pedal shaft is variable with positions of the crank arm. Thus, the position of the rider's foot relative to the pedal shaft may be changed to suit varying conditions such as a down stroke and an up stroke, thereby facilitating pedaling action.

Further and other objects, features and effects of the invention will become apparent from the following more detailed description of the embodiments of the invention taken with reference to the accompanying drawings.

DETAILED DESCRIPTION OF THE PREFERRED EMBODIMENTS

Embodiments of the present invention will be described with reference to the drawings.

Figure 1:
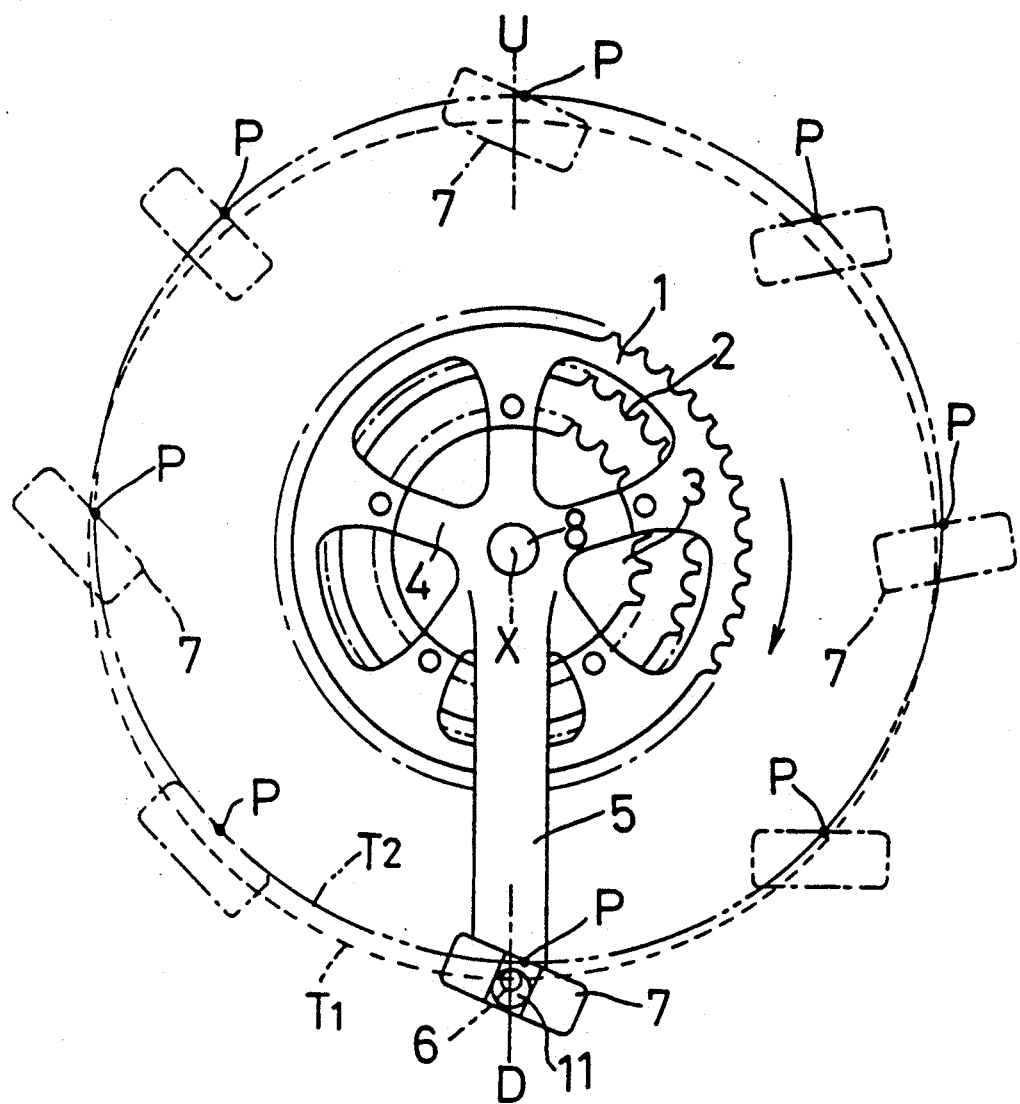
FIG. 1 is a view showing a bicycle crankset and a locus of a pedal according to the present invention.
Figure 2:
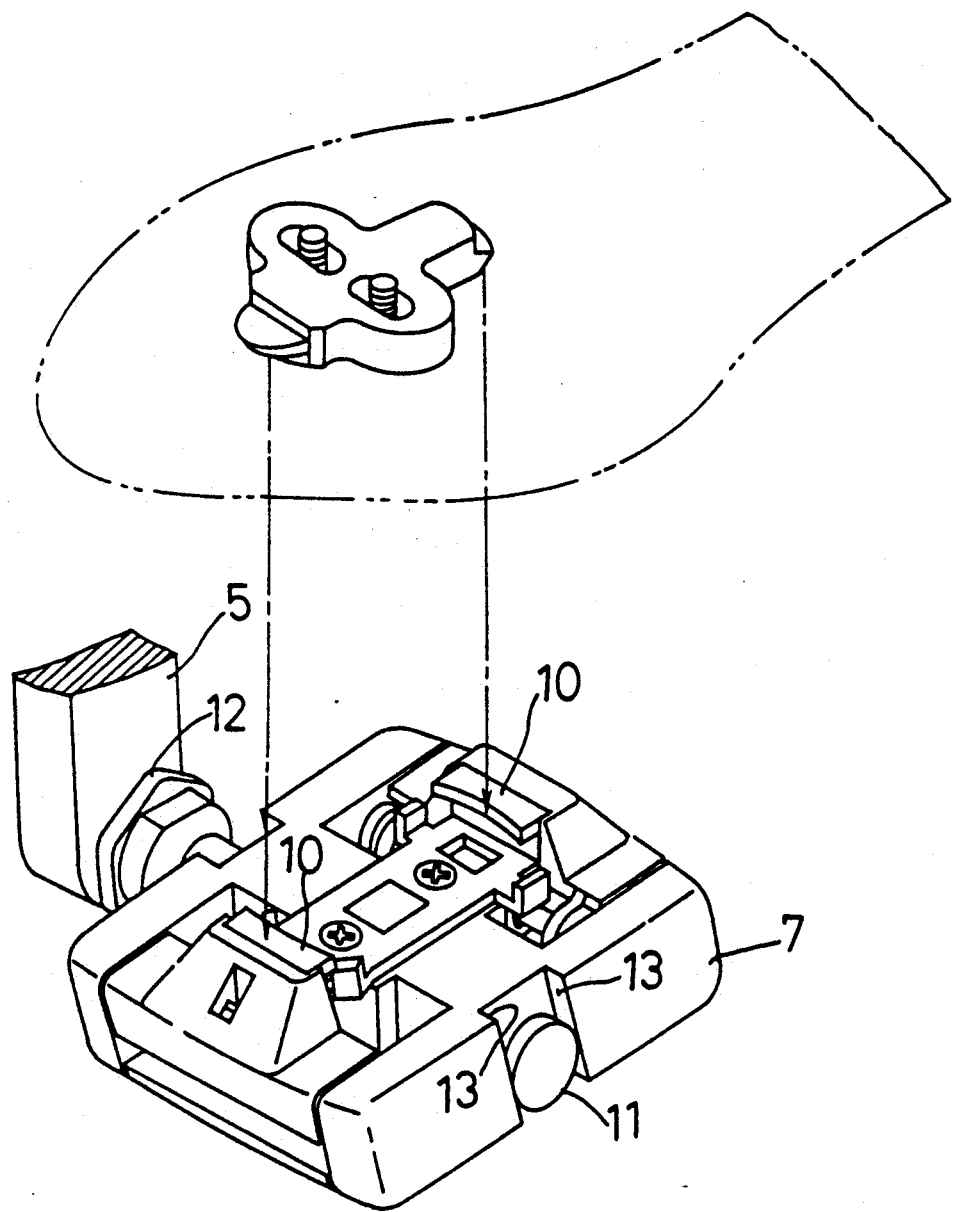
FIG. 2 is a perspective view of the pedal and a cleat.

FIG. 1 shows three sprockets 1, 2 and 3 having different radii. These sprockets 1, 2 and 3 are fixed to a support 4 that is fixedly attached to a crank axle 8. The crank axle 8 is, in turn, rotatably attached to a bicycle frame not shown. Thus, the sprockets 1, 2 and 3 are rotatable with the crank axle 8. A crank arm 5 extends from the support 4, and a pedal shaft 6 is secured to a free end of the crank arm 5 not to be rotatable relative thereto. A pedal 7 is attached to the pedal shaft 6. As shown in FIG. 2, a shoe (shown in a broken line) is attachable to the pedal 7 through a cleat 9 and cleat engaging claws 10.

Figure 3:
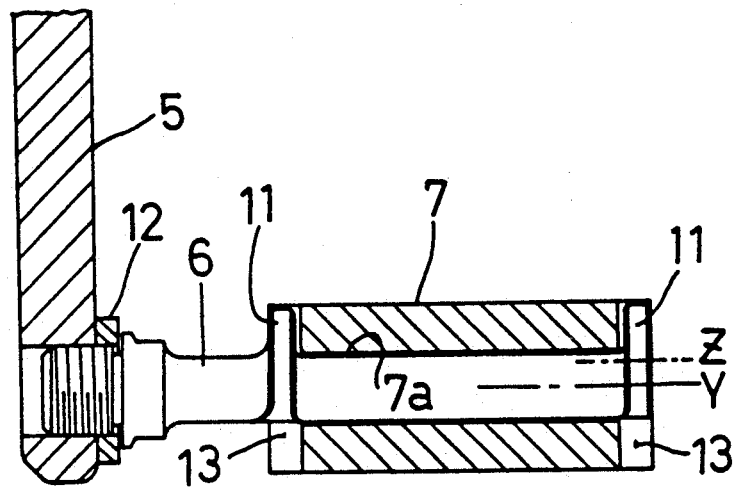
FIG. 3 is a sectional view of the pedal.
Figure 4:
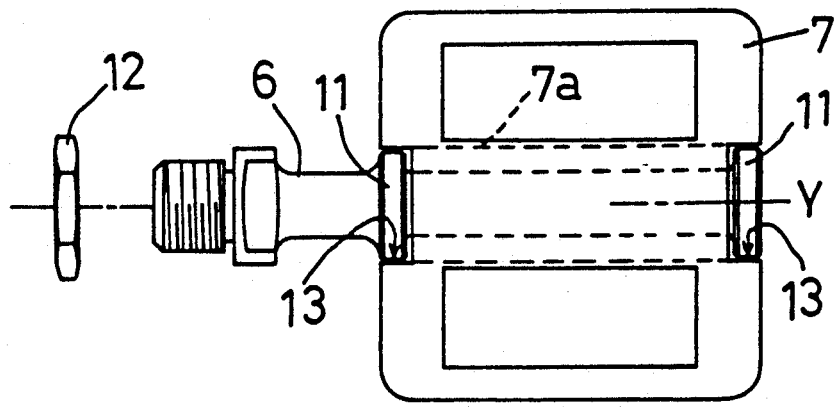
FIG. 4 is a plan view of the pedal and pedal shaft.
Figure 5A:
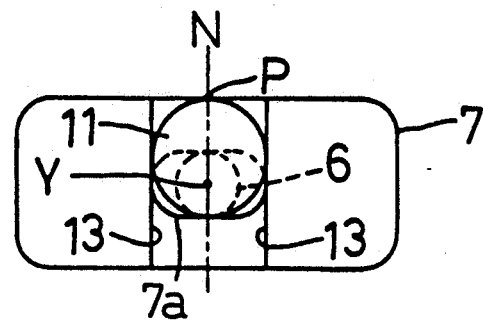
FIGS. 5(a) through (d) are schematic side views showing a cam element fixed to the pedal shaft and cam surfaces of the pedal as well as positions of the pedal relative to the pedal shaft.
Figure 5B:
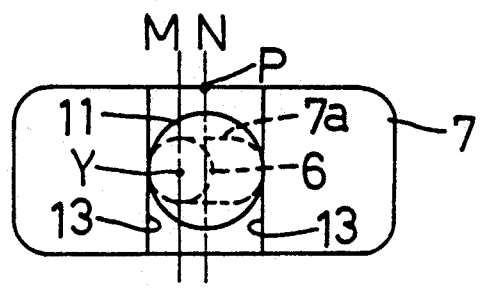

A mechanism for attaching the pedal 7 to the pedal shaft 6 according to the present invention will be described with reference to FIGS. 3 through 5. The pedal 7 defines a pedal shaft receiving bore 7a. As shown in FIGS. 5(a) through (d), the bore 7a is shaped to have a height substantially corresponding to a diameter of the pedal shaft 6 and a width larger than the diameter of the pedal shaft 6 when a surface of the pedal 7 contacting the shoe is horizontal. The pedal 7 further includes parallel surfaces referenced 13 in FIGS. 3, 4 and 5, which are formed at opposite ends thereof axially of the pedal shaft 6. The pedal shaft 6 has substantially circular cam elements 11 fixed thereto. As seen from FIG. 3, the center Z of the circular cam elements 11 is displaced from the center Y of the pedal shaft 6. As shown in FIG. 5(a), the cam elements 11 have a diameter substantially corresponding to a distance between the parallel surfaces 13 at each end of the pedal 7. Orientation of the cam elements 11 relative to the crank arm 5 is adjustable by means of a nut 12 (FIGS. 3 and 4).

When the crank arm 5 is turned through a complete circle about the crank axle 8, the cam elements 11 also make one rotation as shown in FIGS. 5(a) through (d). This is because the cam elements 11 are fixed to the pedal shaft 6 fixed to the crank arm 5. FIG. 5(a) shows a position taken when the crank arm 5 is at an upper dead point (U in FIG. 1). In FIGS. 1 and 5, the right-hand side corresponds to a forward direction of the bicycle. Reference P denotes a middle point in the fore and aft direction of the surface of the pedal 7 contacting the shoe. In FIG. 5(a), a vertical line N extends through the point P and the center Y of the pedal shaft 6. When the crank arm 5 is turned 90 degrees forward, the cam elements 11 are also turned 90 degrees as shown in FIG. 5 (b). At this time, since the center Z of the cam elements 11 is displaced from the center Y of the pedal shaft 6, positions on the cam elements 11 remotest from the center Y of the pedal shaft 6 contact the surfaces 13 and push the pedal 7 forward (rightward in the drawings). The vertical line N extending through the point P is now separated from a vertical line M extending through the center Y of the pedal shaft 6. That is, the pedal 7 is displaced forward relative to the pedal shaft 6 by an amount corresponding to a distance between lines N and M. It should be noted here that, since the height of the shaft receiving bore 7a substantially corresponds to the diameter of the pedal shaft 6, the cam elements 11 move the pedal 7 only leftward and rightward in FIGS. 5(a) through (d).

Figure 5C:
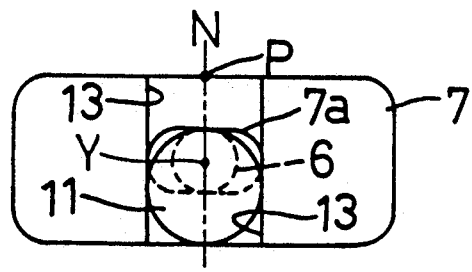
Figure 5D:
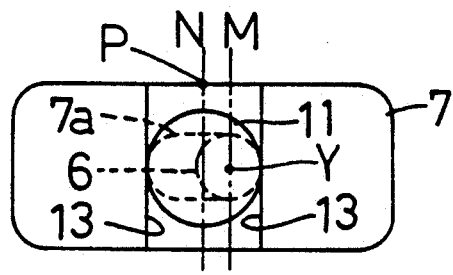

FIG. 5(c) shows a pedal position when the crank arm 5 is further turned 90 degrees to a lower dead point (D in FIG. 1). Since the cam elements 11 are sideways symmetric about the center Y of the pedal shaft 6, lines N and M coincide at this time as depicted. FIG. (d) shows a pedal position when the crank arm 5 is further turned 90 degrees to extend rearwardly of the bicycle. In this state, the positions on the cam elements 11 remotest from center Y of the pedal shaft 6 contact the surfaces 13, and the line N and M are separated from each other again. That is, the pedal 7 is displaced rearward relative to the pedal shaft 6 by an amount corresponding to a distance between lines N and M.

With the above pedal attaching structure according to the present invention, the middle point P in the fore and aft direction of the pedal 7, as shown in FIG. 1, describes a non-circular locus of movement T2 as distinct from the center Y of the pedal shaft 6 which describes a circular locus of movement T1. As a result, the shoe fixed to the pedal 7 through the cleat moves relative to the pedal shaft 6. Thus, during a down stroke of the crank arm 5, the arch of the rider's foot moves to a position directly over the center Y of the pedal shaft 6 to facilitate treading action. During an up stroke of the crank arm 5, the pedal shaft 6 approaches the forward end of the rider's foot to facilitate pedal raising action. While FIGS. 5(a) through (d) show the shoe-contacting surface of the pedal 7 in horizontal posture to illustrate movement of the cam elements 11 relative to the pedal 7. In practice, the pedal 7 inclines with movement of the foot as shown in FIG. 1. However, the pedal 7 in substance moves relative to the pedal shaft 6 as shown in FIGS. 5(a) through (d).

Another embodiment will be described next with reference to FIGS. 6(a) through (d) and FIG. 7.

Figure 7:
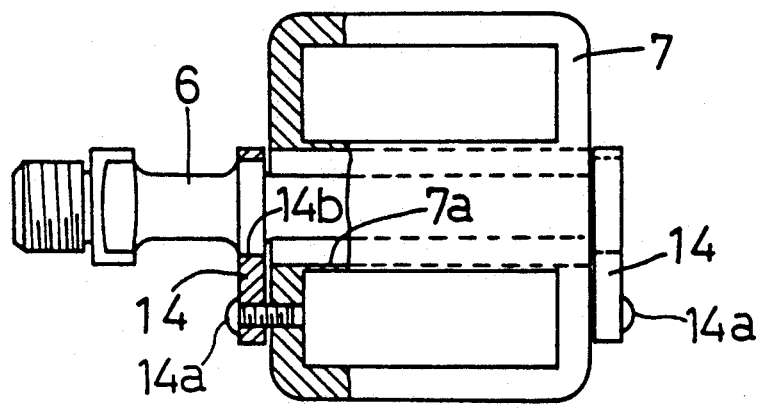
FIG. 7 is a plan view, partly in section, of a pedal in the embodiment shown in FIGS. 6(a) through (d), FIGS. 8(a) through (d) are schematic side views of a further embodiment with a gear fixed to a pedal shaft and teeth formed in a pedal, and also showing varied positions of the pedal relative to the pedal shaft.

As distinct from the first embodiment, this embodiment includes cam receivers 14 in place of cam surfaces 13. As best shown in FIG. 7, the cam receivers 14 are formed separately from the pedal 7, and oscillatably attached thereto by mounting screws 14a. Each cam receiver 14 includes a ring portion with an inner surface 14b thereof having the same function as the cam surfaces 13 in the first embodiment.

Figure 6A:
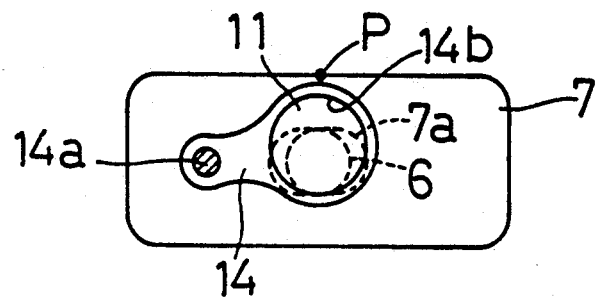
FIGS. 6(a) through (d) are schematic side views showing a pedal attaching structure in another embodiment.
Figure 6B:
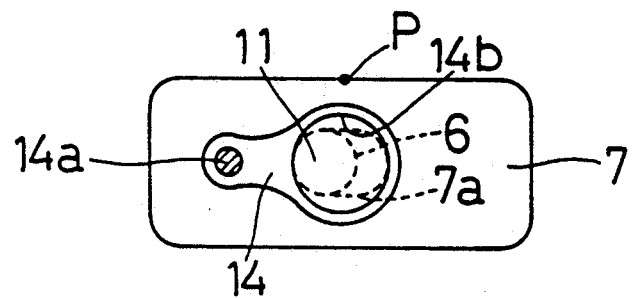
Figure 6C:
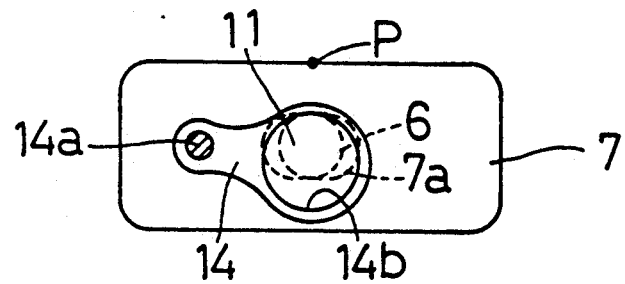
Figure 6D:
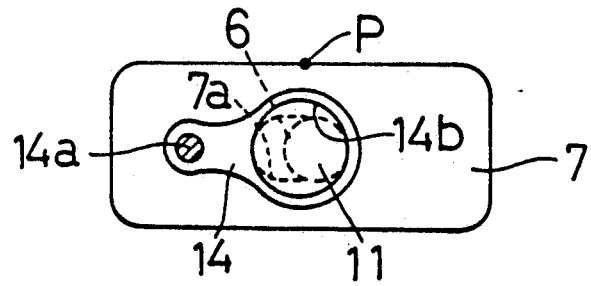

FIG. 6(a) shows a position of the cam elements 11 when the crank arm 5 is at the upper dead point. At this time, the pedal shaft 6 lies substantially midway in the fore and aft direction of the pedal 7. FIG. 6(b) shows a position of the cam elements 11 when the crank arm 5 is turned 90 degrees clockwise and forwardly of the bicycle. At this time, the cam elements 11 push the pedal shaft 6 leftward in the drawing, and thus the pedal shaft 6 is pushed rightward (forwardly of the bicycle). FIG. 6(c) shows a position of the cam elements 11 when the crank arm 5 is further turned 90 degrees to the lower dead point. At this time, the pedal shaft 6 lies substantially midway in the fore and aft direction of the pedal 7. When the crank arm 5 is turned further from this position, the cam elements 11 reach the position shown in FIG. 7(d). In this position, the pedal shaft 6 is pushed rightward in the drawing, whereby the pedal 7 is moved leftward or rearwardly of the bicycle relative to the pedal shaft 6.

Thus, in this embodiment, the pedal 7 is movable relative to the pedal shaft 6 as in the first embodiment. That is, during a down stroke of the crank arm 5, the arch of the rider's foot moves to a position directly over the center of the pedal shaft 6 to facilitate treading action. During an up stroke of the crank arm 5, the pedal shaft 6 approaches the forward end of the rider's foot to facilitate pedal raising action.

FIGS. 8(a) through (d) shown a further embodiment. In this embodiment, the pedal 7 defines a bore having a width extended sideways in the drawings or in the fore and aft direction of the bicycle. The pedal shaft 6 includes gears 15 in place of the cam elements 11 provided in the first and second embodiments. The gears 15 are disposed adjacent the opposite ends of the pedal 7, and are formed over about half peripheral surfaces of the pedal shaft 6, respectively. Teeth 16 and 17 are formed on inside surfaces of the bore to engage the gears 15.

Figure 8A:
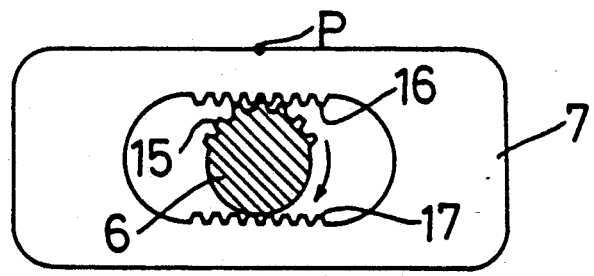
Figure 8B:
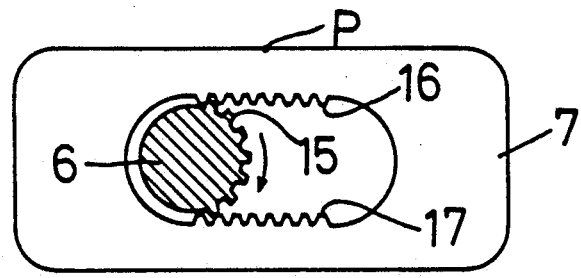
Figure 8C:
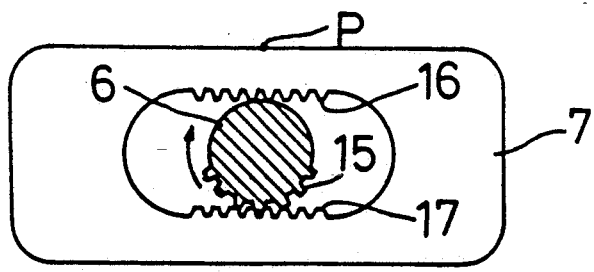
Figure 8D:
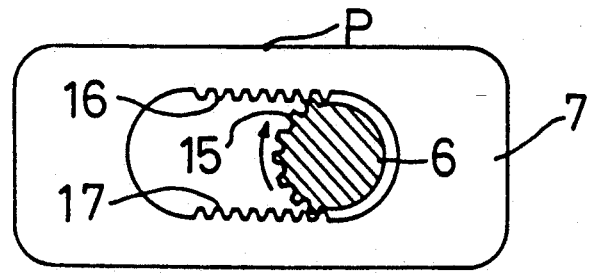

FIG. 8(a) shows a position of the gears 15 when the crank arm 5 is at the upper dead point. The gears 15 engaged with the teeth 16 are rotatable clockwise (as shown by an arrow) with forward turning of the crank arm 5, to push the pedal 7 rightward or forwardly of the bicycle. When the crank arm 5 is turned 90 degrees from the upper dead point, the pedal shaft 6 and gears 15 move to the position shown in FIG. 8(b). At this time, the gears 15 are engaged with both of the teeth 16 and 17 as shown. With further turning of the crank arm 5, the gears 15 continue to rotate clockwise and engage with the teeth 17 only. It is to be noted that, when the gears 15 are engaged with the teeth 17, the clockwise rotation of the pedal shaft 6 pushes the pedal 7 leftward or rearwardly of the bicycle as opposed to the case shown in FIG. 8(a). FIG. 8(c) shows a position of the pedal shaft 6 and gears 15 when the crank arm 5 reaches the lower dead point. FIG. 8(d) shows a position of the pedal shaft 6 and gears 15 when the crank arm 5 is further turned 90 degrees.

Figure 9:
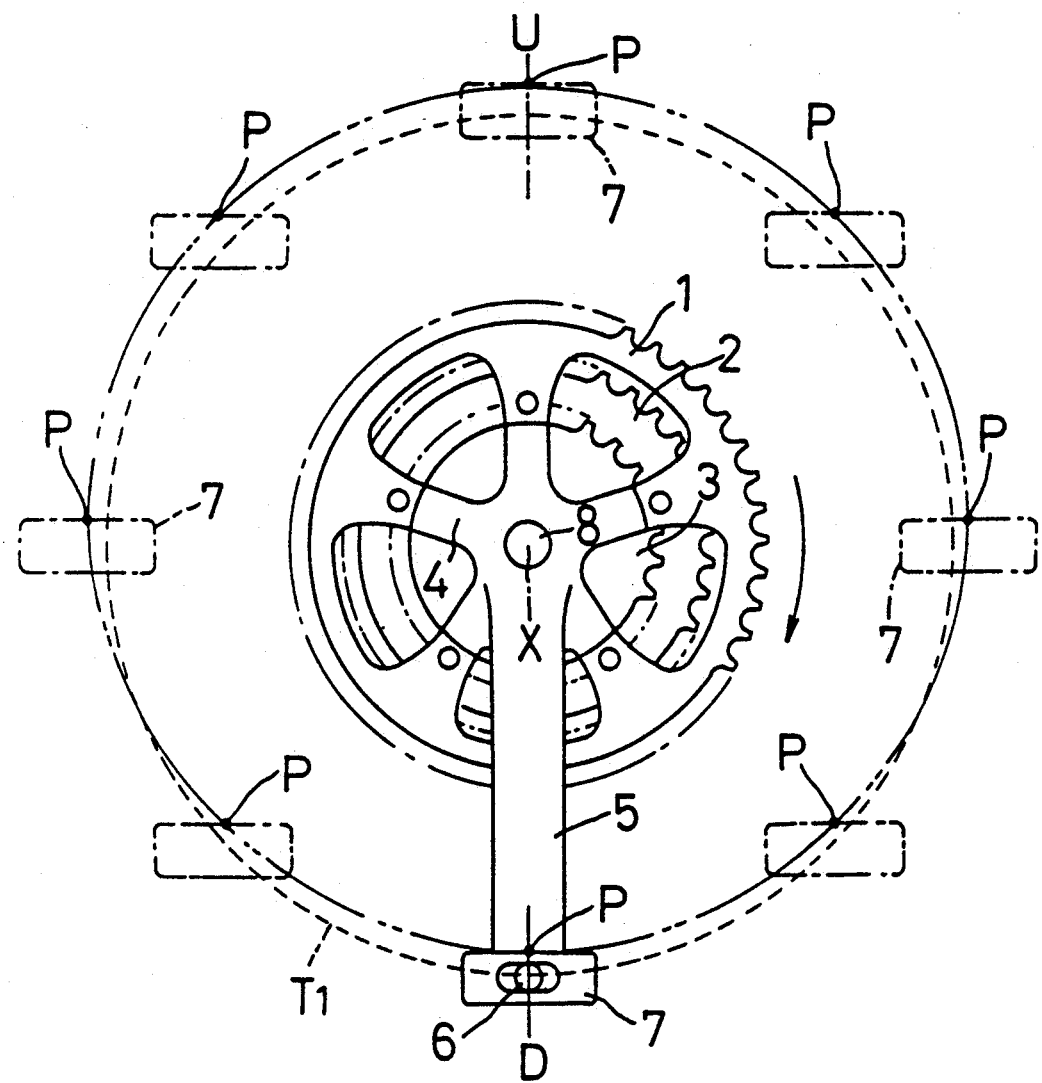
FIG. 9 is a side view showing movement of the pedal in the embodiment shown in FIGS. 8(a) through (d)

Thus, in this embodiment, the pedal 7 is movable relative to the pedal shaft 6 as in the first embodiment. That is, during a down stroke of the crank arm 5, the arch of the rider's foot moves to a position directly over the center of the pedal shaft 6 to facilitate treading action. During an up stroke of the crank arm 5, the pedal shaft 6 approaches the forward end of the rider's foot to facilitate pedal raising action. FIG. 9 shows, in a solid line, a locus of movement described by the middle point P of the pedal 7 when the crank arm 5 is turned 360 degrees. In FIG. 9, the pedal maintained horizontal all the way through for facility of illustration. On the other hand, the pedal shaft 6 describes a circular locus of movement T2 as shown in a broken line.

Figure 10:
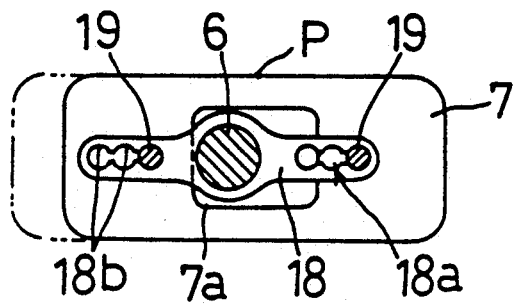
FIG. 10 is a side view showing a pedal attaching structure in a further embodiment of the invention.

FIG. 10 shows a different embodiment of the invention. This embodiment is the same as the preceding embodiments with respect to the movement of the pedal 7 relative to the pedal shaft 6. This embodiment differs from the preceding embodiments in that the pedal 7 is manually movable relative to the pedal shaft 6 by a force of the rider's foot. As shown in FIG. 10, the pedal shaft 6 includes plate-like mounting members 18 disposed adjacent the opposite ends of the pedal 7 transversely of the bicycle. Each mounting member 18 defines bores 18a and 18b shaped as shown in the drawing. The pedal 7 has connecting pins 19 for engaging the bores 18a and 18b, respectively. The bore 18a, for example, has three positions for receiving the corresponding pin 19. The mounting member 18 is formed of an elastic material such as a thin metal plate. The connecting pin 19 is movable from one position in the bore 18a to a next position by a force of the rider's foot applied to push the pedal 7. This results in a change of position of the pedal 7 relative to the pedal shaft 6. The bore 18a is shaped to apply a resistance to movement of the connecting pin 19, and therefore the pin 19 is movable only when a force exceeding a predetermined value is applied to the pedal 7. The predetermined value may be selected to allow the pedal 7 to be moved forwardly of the bicycle by a pedaling force applied during a down stroke of the pedal, and to be moved rearwardly by a pedal raising force during an up stroke of the pedal.

Figure 11:
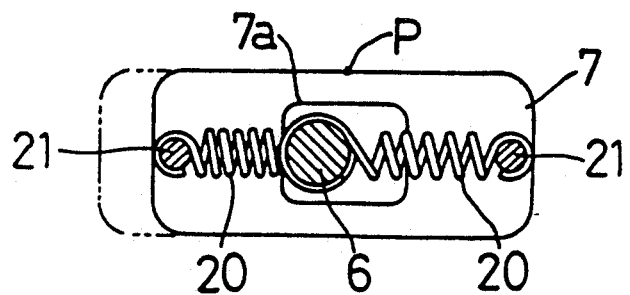
FIG. 11 is a side view showing springs extending between a pedal and a pedal shaft in a still further embodiment of the invention.

FIG. 11 shows a still further embodiment. This embodiment includes a pair of return springs 20 extending between the pedal shaft 6 and supports formed on each end of the pedal 7. The return springs 20 urge the pedal shaft 6 toward the middle point in the fore and aft direction of the pedal 7. FIG. 11 shows a position taken when the crank arm 5 is turned downward. In this state, the rider's foot applies a rightward (i.e. forwardly of the bicycle) force to the pedal 7. Consequently, the pedal 7 is moved rightward relative to the pedal shaft 6 against the elastic force of the return springs 20. With this movement, the arch of the rider's foot lies substantially over the pedal shaft 6 to facilitate downward treading action. Conversely, during an up stroke of the crank arm 5, the rider's foot pulls the pedal 7 leftward in FIG. 11. As a result, the pedal 7 is moved leftward relative to the pedal shaft 6 which then approaches the forward end of the foot. This facilitates pedal raising action during the up stroke of the crank arm 5. When the crank arm 5 is adjacent the upper or lower dead point, the pedal shaft 6 lies substantially at the middle point of the pedal 7 under the urging force of the return springs 20.

What is claimed is:

1. A crank mechanism for a bicycle comprising:
   a crank axle;
   a crank arm rotatable with said crank axle;
   a pedal shaft attached to said crank arm;
   a pedal rotatably supported by said pedal shaft;
   a treading surface provided on said pedal;
   a shaft receiving slot integral with said pedal for attaching said pedal shaft to said pedal, said shaft receiving slot having an elongated shape in a direction parallel to said treading surface to allow a relative displacement of said pedal with respect to said pedal shaft in a direction parallel to said treading surface; and,
   support means for connecting said pedal with said pedal shaft, said support means allowing said parallel displacement of said pedal relative to said pedal shaft.

2. A crank mechanism as claimed in claim 1, wherein said support means includes a circular cam element fixed on said pedal shaft and eccentric with respect to an axis of said pedal shaft and an engagement portion on said pedal with which said cam element engages.

3. A crank mechanism as claimed in claim 2, wherein said engagement portion comprises a pair of parallel cam surfaces, provided on at least one lateral side of said pedal, for contacting said cam element, said cam element being operable, during a down stroke of said crank arm, to push one of said parallel cam surfaces to displace said pedal forwardly of the bicycle relative to said pedal shaft, and during an up stroke of said crank arm, to push the other parallel cam surface to displace said pedal rearwardly of the bicycle relative to said pedal shaft.

4. A crank mechanism as claimed in claim 3, wherein said parallel cam surfaces have linearly extended surfaces extending perpendicular to said treading surface, a distance between said parallel surfaces being substantially equal to a diameter of said circular cam element.

5. A crank mechanism as claimed in claim 2, wherein said engagement portion has a circular bore defined in one end thereof and a diameter substantially equal to a diameter of said circular cam element, said bore being in freely rotatable engagement with said circular cam element, said engagement portion being pivotally connected at another end thereof to said pedal.

6. A crank mechanism as claimed in claim 1, wherein said support means includes a gear formed peripherally of said pedal shaft, and a first toothed surface and a second toothed surface formed on an upper and lower walls of said shaft receiving slot respectively, said gear being engageable with said first toothed surface during a down stroke of said crank arm to move said pedal forwardly of the bicycle relative to said pedal shaft, and engageable with said second toothed surface during an up stroke of said crank arm to move said pedal rearwardly of the bicycle relative to said pedal shaft.

7. A crank mechanism as claimed in claim 1, wherein said support means includes an elastic means interposed between said pedal shaft and said pedal, said elastic means extending substantially parallel to said treading surface to allow said parallel displacement of said pedal relative to said pedal axis shaft.

8. A crank mechanism as claimed in claim 7, wherein said elastic means includes a pair of coil springs each having one end connected to said pedal shaft and another end connected to said pedal.

9. A crank mechanism as claimed in claim 7, wherein said elastic means includes an elongated hole defining a plurality of engaging positions for engaging an engaging portion of said pedal, said engaging portion being movable from one to another of said engaging positions when a pedaling force exceeds a predetermined value, thereby moving and retaining pedal relative to said pedal shaft.

* * * * *